May 5, 1970   J. H. COWLES   3,510,182
BEARING SEALS FOR DRAWN CUP BEARINGS
Filed May 27, 1966   2 Sheets-Sheet 1
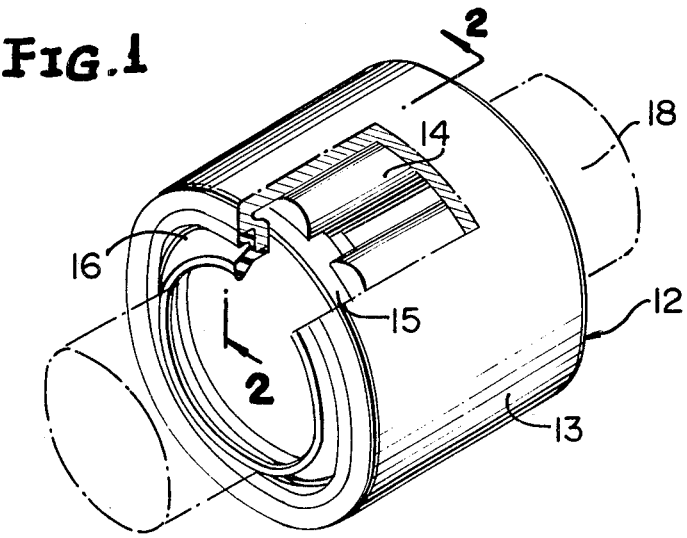
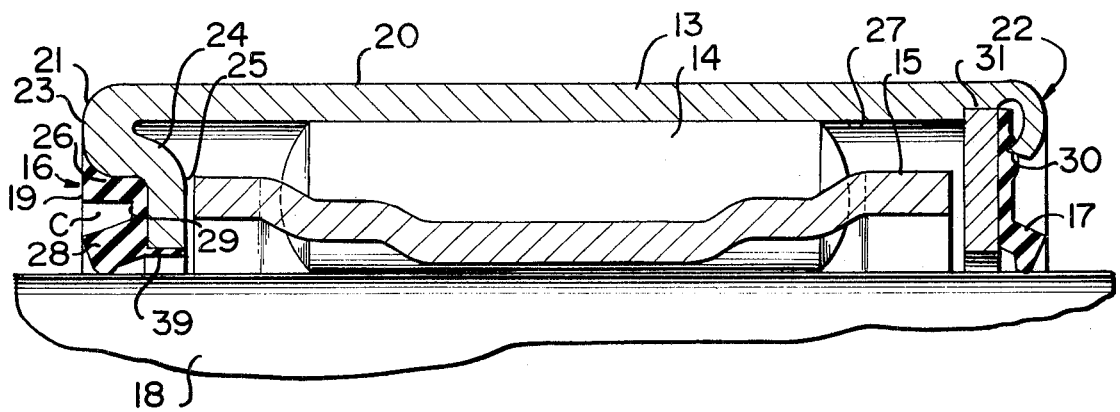
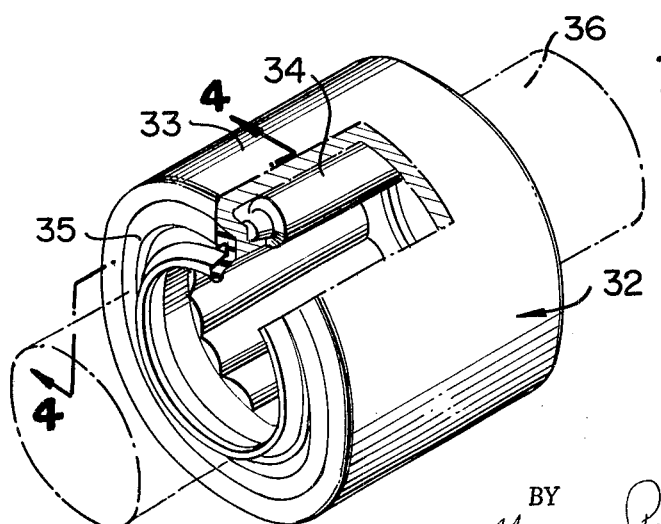
INVENTOR
JOHN H. COWLES May 5, 1970        J. H. COWLES        3,510,182
BEARING SEALS FOR DRAWN CUP BEARINGS
Filed May 27, 1966        2 Sheets-Sheet 2
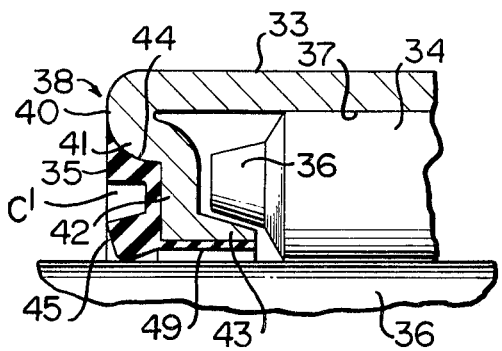
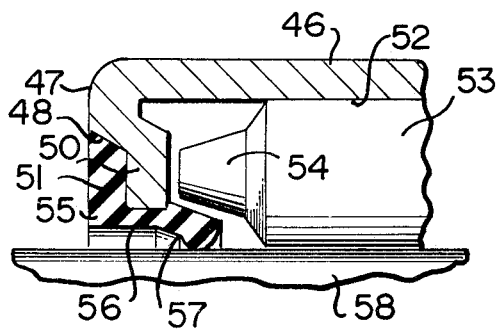
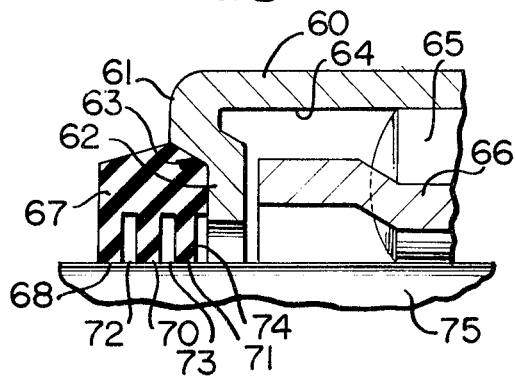
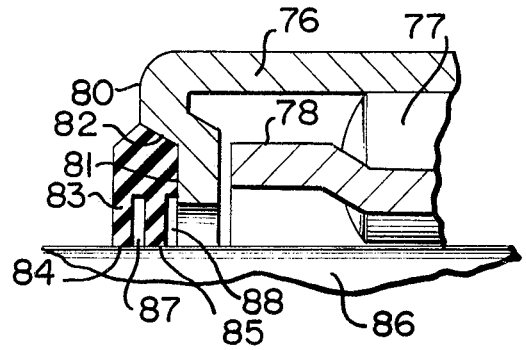
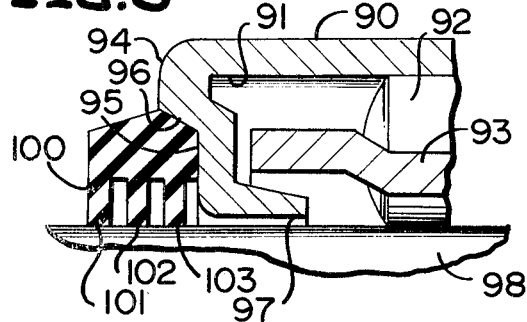
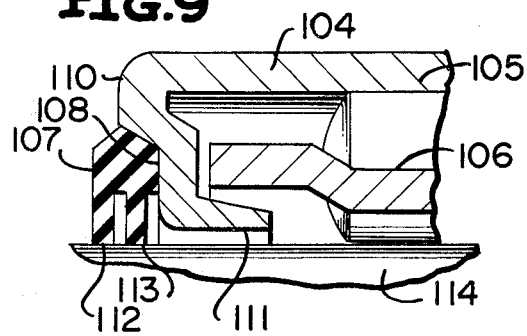
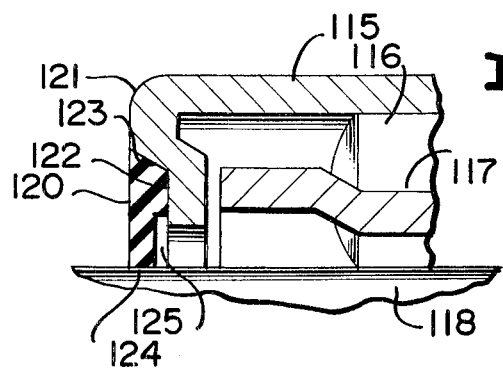
INVENTOR
JOHN H. COWLES
BY Mason, Porter, Diller & Brown
ATTORNEYS

United States Patent Office 3,510,182
Patented May 5, 1970

3,510,182
BEARING SEALS FOR DRAWN CUP BEARINGS
John H. Cowles, Forestville, Conn., assignor to The Torrington Company, Torrington, Conn., a corporation of Maine
Continuation-in-part of application Ser. No. 329,555, Dec. 10, 1963. This application May 27, 1966, Ser. No. 553,553
The portion of the term of the patent subsequent to Feb. 28, 1984, has been disclaimed
Int. Cl. F16c 33/78
U.S. Cl. 308—187.2
9 Claims

ABSTRACT OF THE DISCLOSURE

There is disclosed a bearing assembly of the drawn cup outer race type having rollers mounted for rotation within the race and a cup lip extending radially inwardly of at least one end of the cup defining an annular end wall for the cup, there being provided an annular recess in an outer surface of the cup lip, the recess being defined by an annular portion of the cup lip extending axially and inwardly of the cup end wall and an annular portion of the cup lip extending radially inwardly of the cup race, an annular seal being disposed in the lip annular recess and bonded to the lip, the seal including a cylindriform portion lining the inner extremity of the cup lip and an end extension extening endwise and inwardly away from the cylindriform portion to be disposed for resilient engagement with a cooperating shaft.

---

This is a continuation-in-part of applicant's copending application Ser. No. 329,555, filed on Dec. 10, 1963, now Patent No. 3,306,682.

This application relates in general to new and useful improvements in the drawn cup bearing seal art, and more particularly relates to bearing assemblies having seals which are bonded onto annular inturned cup lips.

Accordingly, it is the primary object of this invention to provide a bearing assembly including a drawn cup having an inner race and at least one inturned annular lip at an end thereof, adapted for use with either caged rollers or a full complement of rollers, wherein the cup lip is intented axially inwardly of the cup to define an annular groove wherein there is bonded a bearing end seal.

It is another object of this invention to provide a bearing assembly including a drawn cup having a race on the inner surface thereof, and an annular cup lip extending radially inwardly of the race, and axially inwardly of the cup to define an annular recess outwardly of the cup lip adapted to receive a bearing end seal bonded therein and an annular flange extending axially inwardly of the cup lip adapted to engage ends of bearing rollers and thereby confine rollers generally adjacent the bearing race during installation of bearing assemblies onto a shaft.

It is another object of this invention to provide a bearing assembly including a drawn cup having a race on the inner surface thereof, and an annular cup lip extending radially inwardly of the race, and axially inwardly of the cup to define an annular recess outwardly of the cup lip adapted to receive a bearing end seal bonded therein and an annular flange extending axially inwardly of the cup lip adapted to engage ends of bearing rollers, which seal includes a radial outermost portion bonded to an adjacent portion of the cup lip, a thickened portion positioned radially inwardly of the outermost portion being connected to the outermost portion adjacent the cup lip, but being partially separated therefrom by an annular channel within the seal; the seal also including an annular cylindrical portion positioned radially inwardly of a terminal portion of the cup lip.

It is a further object of this invention to provide a bearing assembly including a drawn cup having an axially and radially indented annular lip at an end thereof defining an annular recess for receiving a bearing end seal therein, and a race on the inner surface of the bearing cup having rollers retained in adjacent relation thereto by axially extensive portions of the bearing end seal being adapted to engage a roller end and confine the roller in generally adjacent relation to the race during installation of the bearing assembly onto a shaft.

It is yet another object of this invention to provide a bearing assembly including a bearing cup having an axially indented annular cup lip at an end thereof defining an annular recess at an outer end of the cup lip and an annular seal bonded in the recess with a plurality of annular shaft-engaging lips extending radially inwardly of the seal.

It is another object of this invention to provide a bearing assembly including a bearing cup having an annular axially indented cup lip at an end thereof terminating in an axially inwardly extending flange and an annular seal having a plurality of shaft-engaging ribs, the seal being bonded in a recess defined by the axially indented cup lip, the cup being adapted to confine rollers of either the caged or full complement type adjacent a race surface of the cup.

With the above and other objects in view that will hereinafter appear, the nature of the invention will be more clearly understood by reference to the following description, the appended claims and the several views illustrated in the accompanying drawings.

In the drawings:

FIG. 1 is a top perspective view of the bearing assembly of this invention, having a portion of one end broken away for clarity and illustrates an axially indented cup lip defining a recess in which a bearing end seal is bonded, according to this invention.

FIG. 2 is a fragmentary sectional view of a portion of the bearing assembly of FIG. 1 taken along the line 2—2 of FIG. 1 wherein there is illustrated an enlarged view of a double sealed bearing assembly in combination with caged rollers, and disposed about a cooperating shaft.

FIG. 3 is a top perspective view of a bearing assembly of this invention, having a portion of one end broken away for clarity and illustrates a bearing cup with an axially indented cup lip at one end thereof terminating in an inwardly directed flange and a seal bonded within a recess defined by the indented cup lip, in combination with a full complement of rollers.

FIG. 4 is an enlarged fragmentary sectional view of a portion of the bearing assembly of FIG. 3 taken along the line 4—4 of FIG. 3 and illustrates the adaptability of the axial flange of the cup lip to engage a roller trunnion and confine an associated roller adjacent a cup race, as well as an end in engagement with a cooperating shaft.

FIG. 5 is an enlarged fragmentary sectional view of another bearing assembly of this invention, taken along a line similar to that 4—4 of FIG. 3 and illustrates a seal bonded within an axially indented portion of a cup lip, the seal having an axially inwardly extending annular flange portion adapted to engage a roller trunnion and confine a roller adjacent a cup race during installation of the assembly onto a cooperating shaft, and to sealingly engage the shaft after such installation.

FIG. 6 is an enlarged fragmentary sectional view of another bearing assembly of this invention taken along a line similar to that 4—4 of FIG. 3 and illustrates a seal having three annular ribs in engagement with a cooperating shaft, the seal being bonded to a recess formed by an axially indented cup lip, in combination with rollers of the caged type.

FIG. 7 is an enlarged fragmentary sectional view of yet another bearing assembly of this invention, taken along a line similar to that 4—4 of FIG. 3, and illustrates a bearing end seal having two annular ribs in cooperating engagement with an associated shaft, the seal being bonded within a recess defined by an axially indented cup lip, in combination with rollers of the caged type.

FIG. 8 is an enlarged fragmentary sectional view of another bearing assembly of this invention, taken along a line similar to that 4—4 of FIG. 3, and illustrates an axially indented cup lip terminating in an axially extensive flange and bearing end seal having three annular ribs in cooperating engagement with an associated shaft, in combination with rollers of the caged type.

FIG. 9 is an enlarged fragmentary sectional view of another bearing assembly of this invention, taken along a line similar to that 4—4 of FIG. 3, and illustrates a bearing cup having an axially indented cup lip, defining an annular recess and terminating in an axially extensive flange, including a seal having two annular ribs in cooperating engagement with an associated shaft and bonded within the cup lip recess, in combination with rollers of the caged type.

FIG. 10 is an enlarged fragmentary sectional view of yet another bearing assembly of this invention, taken along a line similar to that 4—4 of FIG. 3, and illustrates a bearing cup having an axially indented cup lip defining on its outer surface an annular recess wherein there is bonded a bearing end seal adapted for cooperating engagement with an associated shaft, in combination with bearing rollers of the caged type.

Referring now to the drawings in detail, reference is first made to FIG. 1 wherein there is illustrated a bearing assembly generally designated by the numeral 12 comprising a cylindrical drawn cup outer shell 13, a plurality of cylindrical rollers 14, a roller retaining cage 15, bearing end seals 16 and 17 at opposite ends of the cup, the bearing assembly 12 being mounted on a cylindrical shaft 18 (shown in phantom).

The bearing cup 13 comprises a cylindrical outer shell 20 and annular radially inwardly directed end lips 21, 22 at the left and right ends, respectively, of the illustration of FIG. 2. The cup lip 21 is radially inwardly directed at 23, and then axially indented to define a radially and axially extending annular portion 24 which terminates in a radially inwardly extending portion 25. An annular reces 26 is formed by the indentation of portion 25 from the end portion 23 of the cup lip 21. The bearing cup 13 includes a hardened inner race surface 27 for the rollers 14 and houses the cage 15.

The seal 16 is bonded within the recess 26 by a vulcanizing or other suitable process, and includes an innermost annular portion 28 which is both radially inwardly and axially outwardly extensive of the cup lip portion 25, terminating in a thickened tip in resilient engagement with the associated shaft 18. An annular radially outermost seal portion 19 is joined to portion 28 by an annular web 29, thereby defining an annular channel C between portions 19 and 28. An annular axially extensive cylindriform seal portion 39 of the seal 16 is positioned with and secured to an inner edge of lip portion 25.

The annular lip 22 of the cup 13 is curled radially inwardly and terminates in an annular edge 30 which engages the seal 17, as by piercing. The seal 17 is bonded to a washer 31, and both seal 17 and washer 31 are retained inwardly of the peripheral lip 22 of the cup 13, with a thickened tip of the seal 17 in resilient contacting engagement with the shaft 18.

In FIG. 3 there is illustrated an alternative bearing assembly 32 comprising a drawn cup outer shell 33, a full complement of bearing rollers 34 and a bearing end seal 35 at at least one end thereof, the bearing assembly 32 being shown operatively disposed about a shaft 36 (in phantom).

FIG. 4 illustrates the bearing end seal construction of FIG. 3 with greater clarity, particularly illustrating the rollers 34 as having trunnion ends 36 and being disposed adjacent an inner race surface 37 of the bearing cup 33. The cup 33 has an annular cup lip 38 disposed at one end thereof. The cup lip 38 has a radially inwardly extending annular portion 40, an axially and radially inwardly extending annular portion 41, and a radially inwardly extending portion 42, terminating in an annular flange 43 extending axially inwardly of the cup 33, adjacent the shaft 36. The flange 43 is adapted to engage the trunnion 36 of each of the rollers 34 in a radially outwardly direction adjacent the race 37 of the cup 33, during installation of the bearing assembly 32 on the shaft 36. The axially indented portion 42 of the cup lip 38, along with portion 41, define an annular recess 44 in the cup lip 38 which receives the seal 35 bonded thereto as by vulcanizing. The seal 35 has a terminal portion 45 which extends radially inwardly and axially outwardly of the portion 42 in engaging relation with the shaft 36, and adapted to confine a lubricant inwardly of the seal 35, in communicating relation with each of the rollers 34. The seal also includes an annular channel C' and an axially extensive annular cylindriform seal portion 49, similar to that illustrated at the left in FIG. 2.

In FIG. 5 there is illustrated a bearing cup 46, having a cup lip 47 having a radially and axially indented portion 48 terminating in a radially indented portion 50, defining an annular recess 51 in the outer surface of the cup lip 47. The cup 46 has an inner race 52 for bearing rollers 53 having trunnion ends 54. An annular seal 55 is provided bonded within the recess 51, and has an annular axially extending cylindriform portion 56 which terminates in a radially and axially extending annular portion 57 in engagement with an inner edge of portion 50 and having a thickened tip in resilient contacting engagement with an associated shaft 58. Portion 57 of the seal 55 is adapted to engage a trunnion 54 of each of the rollers 53 and thereby confine the rollers 53 adjacent the race 52 of the cup 46, during installation of the bearing assembly onto the shaft 58.

In FIG. 6 there is illustrated a bearing cup 60 having a cup lid 61 and an axially indented annular portion 62, similar to that illustrated in FIG. 5, defining an annular recess 63. The cup 60 has an inner race surface 64 for cylindrical rollers 65, which are retained in position by a suitable cage 66. A seal 67 is provided, bonded within the recess 63 of the cup lip 61, by vulcanizing or the like. The seal 67 protrudes axially outwardly of the cup lip 61 and has three annular resilient shaft-engaging ribs 68, 70 and 71 integral therewith and defining annular recesses 72, 73 and 74 therebetween and adjacent indented portion 62 of the cup lip 61. The annular ribs 68, 70 and 71 extend radially inwardly of the cup 60 and cooperate with an associated shaft 75 to confine a lubricant within the cup 60 in communicating relation with the rollers 65 and the cage 66.

In FIG. 7 there is illustrated a bearing cup 76, cylindrical rollers 77, a roller case 78, an annular cup lip 80 integral with the cup 76 and indented to define an indented lip portion 81 having a recess 82 axially outwardly thereof. A seal 83 is disposed within the recess 82, in a manner similar to that illustrated in FIG. 6. The seal 83 projects axially outwardly of the cup lip 80 and includes two integral annular radially inwardly directed ribs 84, 85 terminating adjacent a cooperating shaft 86, in resilient engagement therewith. An annular groove 87 is disposed between the ribs 84 and 85, as is an annular groove 88 disposed between the rib 85 and portion 81 of the cup lip 80.

In FIG. 8 there is illustrated a bearing cup 90 having an inner race 91 for cylindrical bearing rollers 92. The bearing rollers 92 are retained in position by a suitable retaining cage 93. At at least one end of the cup 90 is a radially inturned cup lip 94 having an axially indented lip portion 95 defining an annular recess 96 in the outer surface of the cup lip 94. The cup lip 94 terminates in an annular radially inwardly extending flange 97 in adjacent relation to a cooperating shaft 98. A seal 100 is disposed within the recess 96 and protrudes outwardly therefrom, carrying radially inwardly extending ribs 101, 102 and 103, similar to those illustrated in the seal of FIG. 6. The ribs 101, 102 and 103 are integral with the seal 100 and are constructed for resilient cooperating engagement with the shaft 98 in retaining a lubricant inwardly of the cup 90 in adjacent relation to the rollers 92 and cage 93.

In FIG. 9 there is illustrated a bearing assembly including a bearing cup 104, rollers 105, a roller cage 106 and a seal 107 bonded within a recess 108 formed in a cup lip 110. The cup lip 110 terminates in an axially inwardly extending flange 111 similar to that described in reference to the illustration of FIG. 8. The seal 107, however, protrudes outwardly of the cup lip 110 and carries two radially inwardly annular ribs 112, 113 integral therewith and in resilient cooperating engagement with an associated shaft 114.

In FIG. 10 there is illustrated a bearing assembly including a bearing cup 115, a roller 116, a roller retaining cage 117, an associated shaft 118 and a bearing end seal 120. The bearing cup 115 has a bearing cup lip 121 at one end thereof having an axially inwardly indented portion 122 at an end thereof defining an annular recess in the outer surface of the cup lip 121, receiving the annular seal 120 bonded therein. The seal 120 has a radially inwardly directed rib 124 having an annular recess 125 in the axial innermost surface thereof, adjacent the indented portion 122 of the cup lip 121. The seal 120 is adapted to resiliently engage the shaft 118 and thereby confine a lubricant inwardly of the cup 115, in communication with the rollers 116 and cage 117.

The bearing cups illustrated herein may be formed of a drawn sheet metal having hard inner race surfaces in order to accommodate their associated rollers in the usual manner. The rollers may have any desired end configurations such as spherical ends, flat ends, trunnion ends, etc., and may be retained in position either by means of roller cages or by axial extensions of the seals or cup lips cooperating with the roller ends. The seals may be of any suitable construction, such as rubber or plastic, as would yield the desired resiliency and contact pressure.

Although only preferred embodiments of the invention have been described and illustrated herein, it is to be understood that minor modifications may be made in the bearing end seals and in their application.

I claim:

1. In a bearing assembly of the drawn cup outer race type having rollers mounted for rotation within said race and a cup lip extending radially inwardly of at least one end of said cup defining an annular end wall for said cup; the improvement comprising an annular recess in an outer surface of said cup lip; said recess being defined by an annular portion of said cup lip extending axially and inwardly of said cup end wall and an annular portion of said cup lip extending radially inwardly of said race; an annular seal disposed in said lip annular recess and bonded to said lip; said seal including a cylindriform portion lining the inner extremity of said cup lip and an end extension extending radially inwardly away from said cylindriform portion to be disposed for resilient engagement with a cooperating shaft.

2. In a bearing assembly as defined in claim 1 wherein said seal is vulcanized to said cup lip.

3. In a bearing assembly as defined in claim 1 wherein said rollers are of the caged type.

4. In a bearing assembly as defined in claim 1 wherein said rollers are of the full complement type.

5. In a bearing assembly as defined in claim 1 wherein a radially innermost portion of said cup lip has an annular flange means extending axially inwardly of said cup for contacting roller ends and confining rollers in substantially adjacent relation to said cup race prior to installation of said bearing assembly onto a shaft.

6. In a bearing assembly as defined in claim 1 wherein said radially inwardly extending portion of the seal includes a wall portion disposed for contacting roller ends and confining rollers in substantially adjacent relation to said cup race prior to installation of said bearing assembly onto a shaft.

7. In a bearing assembly as defined in claim 1 wherein said seal has an annular channel therein at least in part defining the extending shaft engageable portion of the seal.

8. In a bearing assembly as defined in claim 3 wherein a radially innermost portion of said cup lip has an annular flange extending axially inwardly of said cup.

9. In a bearing assembly as defined in claim 1 wherein said end extension is partially contained within the cup end recess and does not protrude axially outwardly of said cup.

References Cited

UNITED STATES PATENTS

| | | | |
|---|---|---|---|
| Re. 21,584 | 10/1940 | Brodin | 277—94 |
| 2,757,052 | 7/1956 | Spurgeon | 277—94 X |
| 2,907,596 | 10/1959 | Maha | 277—205 |
| 3,003,799 | 10/1961 | Marchionda | 277—205 X |
| 3,021,161 | 2/1962 | Rhoads | 277—208 X |
| 3,117,796 | 1/1964 | Liebig | 277—205 |
| 3,129,985 | 4/1964 | Watson | 308—187.1 |
| 3,203,511 | 8/1965 | Long | 277—208 X |
| 3,206,829 | 9/1965 | Schaeffler | 308—187.1 X |
| 3,207,521 | 9/1965 | Dega | 277—208 |
| 3,306,682 | 2/1967 | Cowles | 308—187.2 |
| 2,659,637 | 11/1953 | Barr | 308—216 X |
| 2,894,791 | 7/1959 | White | 308—217 X |
| 2,806,725 | 9/1957 | Kosatka | 277—182 |
| 2,868,566 | 1/1959 | Kosatka | 277—182 |
| 2,879,114 | 3/1959 | Bowen | 308—187.2 |
| 3,348,889 | 10/1967 | Schaeffler | 308—187.2 X |
| 3,341,265 | 9/1967 | Paterson | 308—187.1 |
| 3,348,889 | 10/1967 | Schaeffler | 308—187.2 |

FOREIGN PATENTS

| | | |
|---|---|---|
| 74,694 | 2/1945 | Austria. |
| 546,260 | 7/1942 | Great Britain. |
| 811,356 | 4/1949 | Great Britain. |
| 112,747 | 12/1944 | Sweden. |
| 162,049 | 3/1955 | Australia. |

OTHER REFERENCES

German printed application, No. 1,075,383, February 1960.

German printed application, No. 1,058,318, May 1959.

MARTIN P. SCHWADRON, Primary Examiner

L. L. JOHNSON, Assistant Examiner

U.S. Cl. X.R.

277—94, 95, 184